Dec. 1, 1931.  L. J. PURDY  1,834,736
METHOD OF ATTACHING FINS TO CYLINDERS
Filed Feb. 28, 1929
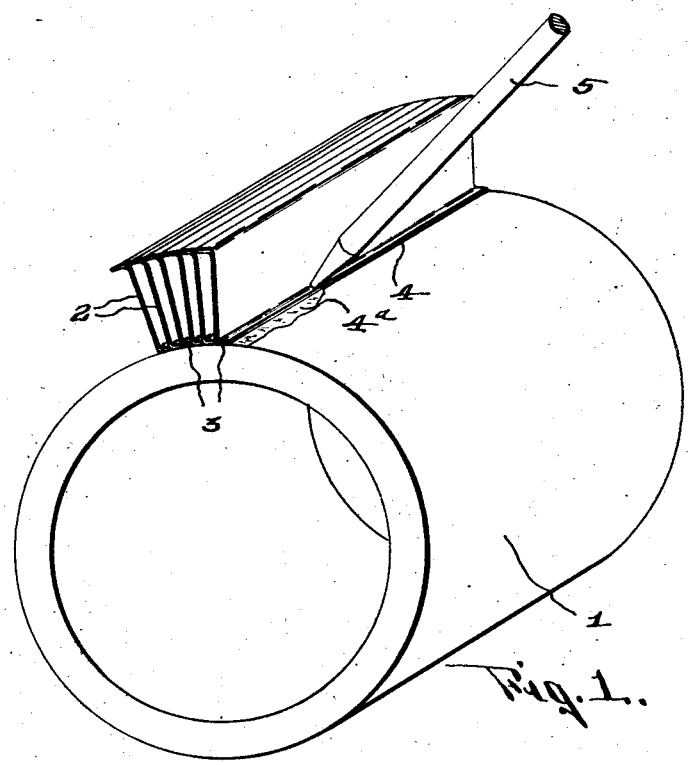
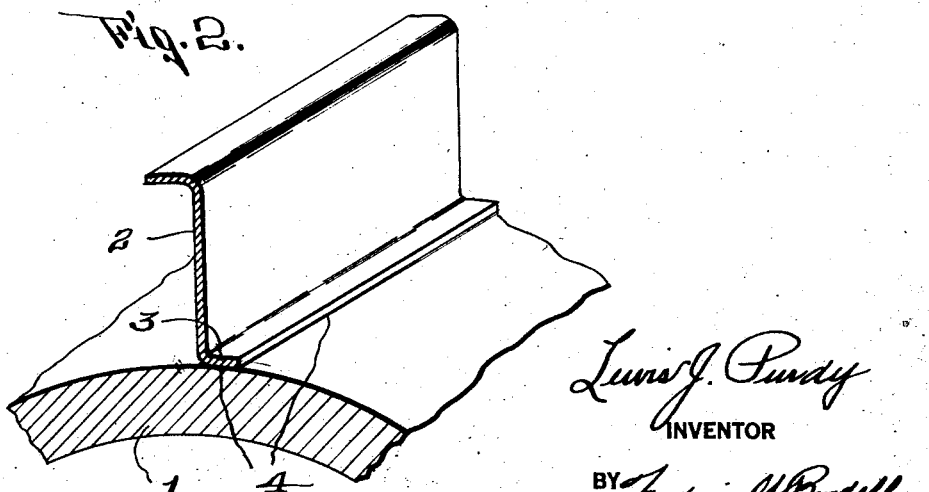
Lewis J. Purdy
INVENTOR
BY Frederic G. Bodell
ATTORNEY Patented Dec. 1, 1931

1,834,736

UNITED STATES PATENT OFFICE

LEWIS J. PURDY, OF SYRACUSE, NEW YORK, ASSIGNOR, BY MESNE ASSIGNMENTS, TO FRANKLIN DEVELOPMENT CORPORATION, OF SYRACUSE, NEW YORK, A CORPORATION OF NEW YORK

METHOD OF ATTACHING FINS TO CYLINDERS

Application filed February 28, 1929. Serial No. 343,468.

This invention relates to joining head radiating fins of a metal having a relatively high heat conductivity or coefficient of expansion, as copper to a body of a metal having a less heat conductivity as a cast iron cylinder, and has for its object a particularly simple and efficient method or process of uniting heat radiating fins as copper fins to the cast iron cylinders of internal combustion engines, by which method or process, uniform and perfect mechanical, heat conducting joints are quickly, economically and permanently made.

The method or process consists in the novel steps hereinafter set forth and claimed.

In describing this invention, reference is had to the accompanying drawings in which like characters designate corresponding parts in all the views.

Figure 1 is a diagrammatic perspective view illustrating my method of applying fins to the cylinders.

Figure 2 is an enlarged fragmentary sectional view in perspective of parts seen in Figure 1.

This process comprises generally in arranging the fins which are preferably copper with angular base flanges overlying the finished peripheral surface of the cast iron cylinder with a strip of solder consisting predominately of silver interposed between the flange and the surface of the cylinder and preferably welding as by arc welding the flange to the cylinder through the silver solder.

The welding, of course, melts or fuses the silver solder so that it unites of forms an alloy with the cast iron and also with the copper fin and some of this fused solder, that is, the excess, runs laterally beyond the edge of the base flange of the fin or fuses with the cylinder wall beyond the lateral edge of the base flange, and the base flange of the next fin with its strip of solder is placed on this portion or strip of the cylinder wall with the excess silver solder fused therein. Therefore, the process or method further consists in fusing a solder consisting predominately of silver into the cylinder wall and welding the base flange of the fin with the strip of solder interposed between it and the cylinder wall to the cylinder wall with a silver fused therein.

The cylinder casting is first rough machined and the periphery thereof finished by grinding.

1 designates the cylinder. 2 the fins having the angular base flanges 3, and 4 are the strips of silver solder.

The strips 4 of silver solder are tack welded or otherwise preliminarily fixed to the flanges 3 of the fins 2, and the fins placed with the silver strip 4 against the peripheral surface 5 of the cylinder 1. The base flange 3 of each fin after the first fin, with its strip 4 of silver solder is placed over or on that portion or strip 4ª of the cylinder wall which has been tinned or coated, by the excess solder from the preceding welding operation.

The heat for welding the flanges 3 to the cylinder is applied by passing an electrode 5 of about one-quarter inch in diameter and tapered to a point along the outer surface of the flange 3. The other electrode of the electric circuit is connected to the cylinder. The current is approximately 40 volts and 100 amperes, and the carbon electrode is set at an angle of about 25° with the side surface of the fin.

The fins are placed in position and preferably attached successively, and the apparatus for holding the cylinder and placing the fins successively and the arc welding tool form no part of this invention. The silver solder, per se, forms no part of this invention. A commercial solder consisting predominately of silver is used.

Owing to the use of silver solder and the placing of the fins with the silver solder strip over the surface of the cylinder in which the silver solder has been fused, a perfect mechanical and thermal heat conducting joint is formed which is permanent or does not break away or loosen nor weaken the cylinder wall.

What I claim is:

1. The process of attaching fins having a greater heat conductivity than cast iron to cast iron cylinders consisting in interposing a strip of solder consisting predominately of silver between the angular base flanges on the fins and the cylinder wall and arc welding the same together, the flange of each fin with its strip of silver solder overlying the strip of alloy formed by the excess solder of the preceding strip and the cylinder wall along the base flange of the preceding strip and being welded to the cylinder wall through such excess solder from the welding operation of the preceding fin.

2. The process of attaching copper fins having angular base flanges to cast iron cylinders, which process consists in preliminarily attaching a strip of solder containing a high percentage of silver to the angular base flanges of the fins, applying the fins to the cylinder with their base flanges next the cylinder and arc welding the base flanges to the cylinder.

3. The method of attaching fins having a greater heat conductivity than cast iron to cast iron cylinders, which method consists in interposing a strip of silver solder between the angular flanges on the fins and the surface of the cylinder, subjecting the flanges to a welding heat sufficient to cause the strip of solder to freely flux with the other metals.

4. The process of attaching fins having a greater heat conductivity than cast iron to cast iron cylinders, which method consists in fusing solder predominately of silver to the base flanges of the fins in an amount in excess of that required, subjecting the flanges to a heat sufficient to cause the solder to fuse with the flanges and the cylinder, the excess solder forming a thin coating on the adjacent cylinder surface for the next welding operation.

In testimony whereof, I have hereunto signed my name, at Syracuse, in the county of Onondaga, and State of New York, this 31st day of December, 1928.

LEWIS J. PURDY.